United States Patent [19]
Spencer

[11] Patent Number: 5,987,806
[45] Date of Patent: Nov. 23, 1999

[54] CASTABLE FISHING BOBBER

[76] Inventor: Donald R. Spencer, Rte. 1, Box 181, Grafton, Ill. 62037

[21] Appl. No.: 08/938,297

[22] Filed: Sep. 26, 1997

[51] Int. Cl.⁶ .................................................. A01K 93/00
[52] U.S. Cl. ............................................................ 43/43.11
[58] Field of Search .................................. 43/43.11, 44.9, 43/44.94

[56] References Cited

U.S. PATENT DOCUMENTS

| | | | |
|---|---|---|---|
| 3,144,729 | 8/1964 | Jonassen | 43/43.11 |
| 3,425,151 | 2/1969 | Salfer | 43/43.11 |
| 4,406,081 | 9/1983 | Garner | 43/43.11 |
| 4,574,515 | 3/1986 | Garner | 43/43.11 |
| 4,825,580 | 5/1989 | Gray | 43/43.11 X |

*Primary Examiner*—Robert P. Swiatek
*Attorney, Agent, or Firm*—Polster, Lieder, Woodruff & Lucchesi, L.C.

[57] ABSTRACT

A bobber which facilitates casting of a fishing line with a substantial portion of the line extended beyond the bobber, includes a spool around which the extended length of line is wound preparatory to a cast, and a float which shifts between cocked and release positions on the spool. When the float is in the cocked position, the extended portion of line remains and is held wound around the spool. When the float moves to the release position, the line pays off of the spool. The line is cast with the float in its cocked position, but when the bobber strikes the water, the float, owing to its buoyancy, shifts to its release position and the extended portion of line pays off of the spool, allowing a hook and bait on the end of the line to descend to a depth best suited for fishing.

8 Claims, 2 Drawing Sheets

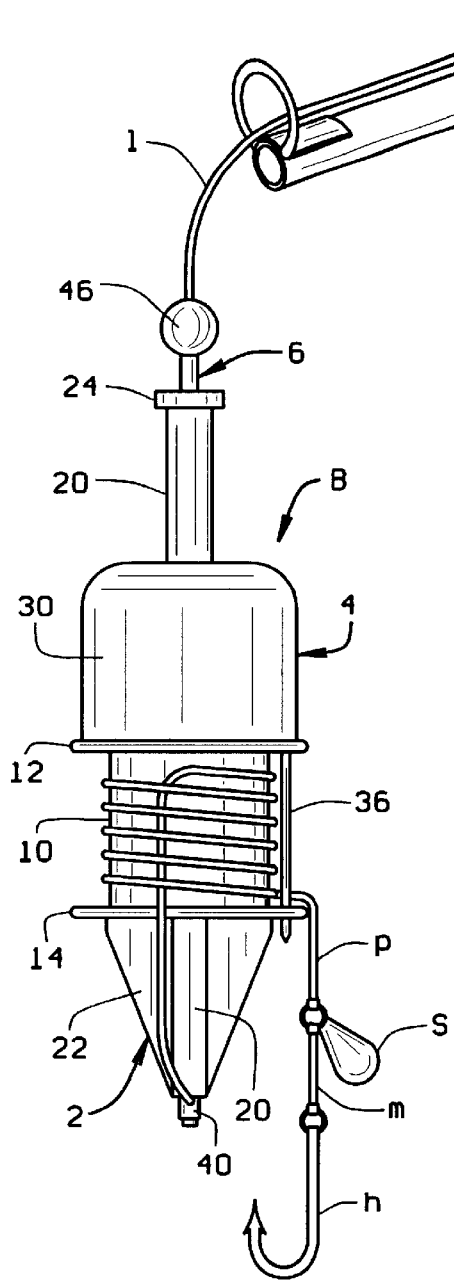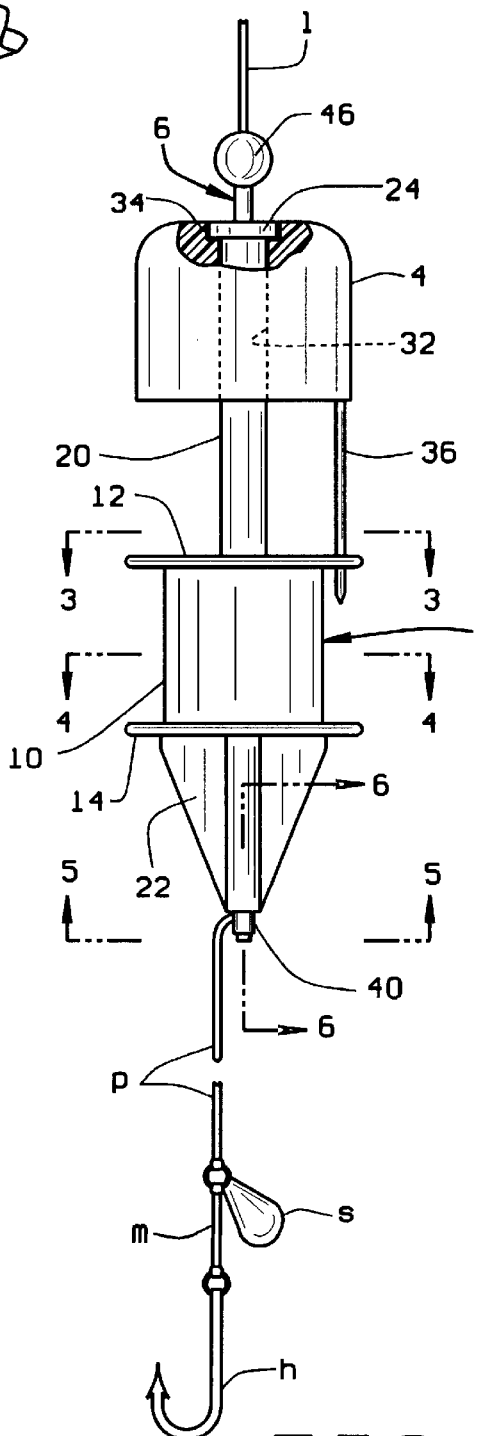
FIG. 1
FIG. 2

CASTABLE FISHING BOBBER

CROSS-REFERENCE TO RELATED APPLICATIONS

STATEMENT REGARDING FEDERALLY SPONSORED RESEARCH OR DEVELOPMENT

Not Applicable.

BACKGROUND OF THE INVENTION

This invention relates in general to fishing tackle and more particularly to a castable fishing bobber capable of releasing a predetermined length of line after it is cast.

The typical bobber attaches to a fishing line with a predetermined length of the line extended beyond the bobber. A sinker and hook are, in turn, attached to the line beyond the bobber. Normally, some type of bait is placed on the hook. But when the line is cast, the portion which extends beyond the bobber must be relatively short, lest it will interfere with the casting motion itself. If the line beyond the bobber is too long, the line cannot be cast accurately with distance. Generally speaking, the length of line that lies beyond the bobber, including the leader, is limited to about the length of the fishing rod. Hence, the hook and bait cannot reach the depths in many bodies of water where fish are most likely to be found.

To be sure, slip bobbers exist that have the capacity to slip along a fishing line until encountering a stop on the line. This allows the angler to cast with the bobber, hook and sinker together at the end of the line. When the sinker and bobber enter the water, the bobber, of course, remains at the surface while the sinker descends, drawing the line through the bobber. The hook and bait descend with the sinker to a depth determined by the stop on the line, for when the stop encounters the bobber, no more line passes through the bobber. But the stop tends to snag on the guides along the fishing rod and interferes with the operation of the reel off of which the line pays. Thus, a slip bobber does not represent a satisfactory solution to the problem.

The present invention resides in a bobber that may be cast accurately. It has the capacity to hold a predetermined length of line neatly stored in a compact arrangement. When the bobber enters the water, it releases the predetermined length of line, allowing the released line, with hook and bait attached, to descend to depths not possible with traditional bobbers that are attached to lines in fixed positions on such line. The invention also consists in the parts and in the arrangements and combinations of parts hereinafter described and claimed.

BRIEF DESCRIPTION OF THE SEVERAL VIEWS OF THE DRAWINGS

In the accompanying drawings which form part of the specification and wherein like numerals and letters refer to like parts wherever they occur.

FIG. 1 is an elevational view of a bobber constructed in accordance with and embodying the present invention with the float of the bobber being in its cocked position and a fishing line wound around the bobber;

FIG. 2 is an elevational view similar to FIG. 1, but showing the float of the bobber in its release position and the fishing line extended downwardly from the bobber;

DETAILED DESCRIPTION OF THE INVENTION

Figure 3:
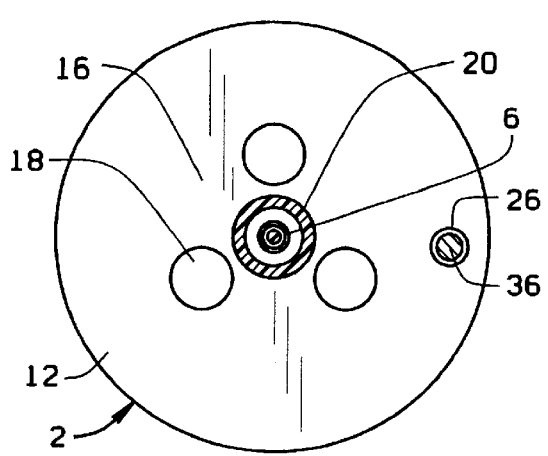
FIG. 3 is a sectional view taken along line 3—3 of FIG. 2 and showing the upper flange of the spool for the bobber.

Referring now to the drawings, a castable bobber B (FIGS. 1 and 2) is attached to a fishing line 1 with a portion p of the line 1 located beyond the bobber B. The remainder of the line 1 is unobstructed and thus free to pass through the guides of a fishing rod R to be stored in a wound condition on a reel mounted on the rod R. The portion p, which extends beyond the bobber A, corresponds in length generally to the depth at which the angler desires to fish. The portion p near its free end, that is at the end which is ultimately remote from the bobber B, has a sinker s attached to it. The sinker s causes the portion p to descend through water until the portion p is fully extended. That is not the condition in which the portion p assumes when the angler casts the line 1. Then the portion p is wound around the bobber B (FIG. 1). But when the bobber B strikes the water, it releases the portion p, allowing the sinker s to extend it (FIG. 2). The portion p carries a hook h, which is attached to it below the sinker s. Normally, bait is placed on the hook h.

The bobber B includes (FIGS. 1 and 2) a spool 2, a float 4 which is on the spool 2, and a line tube 6 which extends through the spool 2. The line 1 passes through the line tube 6 which secures it to the spool 2 with the portion p extended beyond the spool 2. When the line 1 is cast, the portion p is stored on the spool 2—indeed is wound around the spool 2, it being retained in that condition by the float 4. As its name implies, the float 4 has the capacity to float on water, and when it does, it releases the portion p of the line 1 from its stored condition on the spool 2.

Figure 4:
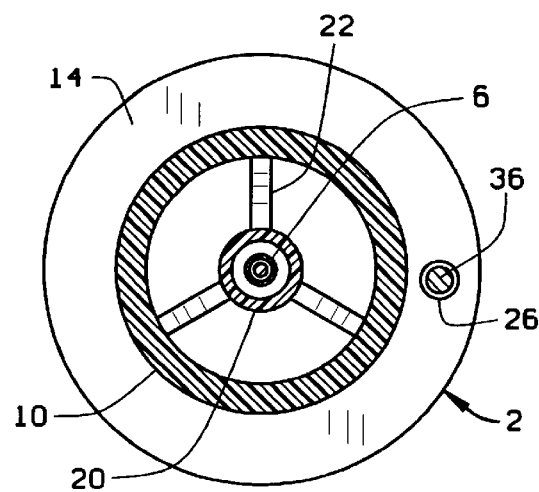
FIG. 4 is a sectional view taken along line 4—4 of FIG. 2 and showing the lower flange of the spool.

The spool 2 is in effect a holding member in that it serves as a holder for the portion p of the line 1 when the portion p is stored on the bobber B. Overall, the spool 2 has a specific gravity greater than water, and were it not for the float 4, the spool 2 would sink in water. The spool 2 includes a cylinder storage surface 10 (FIGS. 2 and 4) and upper and lower flanges 12 and 14 at the ends of the surface 10. The center of the spool 2 is hollow in the region of the storage surface 10 and flanges 12 and 14 to reduce the weight of the spool 2, yet the hollow center is exposed at both flanges 12 and 14 so that water will enter the hollow interior. To this end, the upper flange 12 represents a continuation of a flat wall 16 that extends across the spool 2 (FIG. 3). The wall 16 has several holes 18 which open into the hollow interior and prevent air from being trapped in it.

Figure 5:
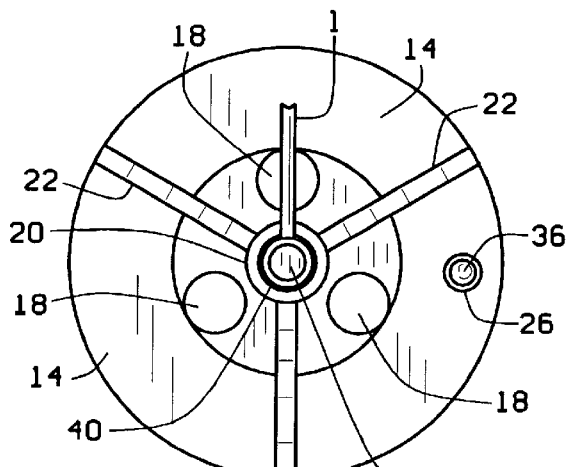
FIG. 5 is an end view of the bobber taken along line 5—5 of FIG. 2.

The spool 2 also includes a guide tube 20 which extends axially beyond both the upper flange 12 and the lower flange 14. Generally midway between its ends, the tube 20 passes through the flat wall 16, and indeed the tube 20 is confined by and secured to the wall 16. The lower end of the tube 20, that is the region that projects beyond the lower flange 14, is confined and stabilized by three webs 22 (FIGS. 2 and 5) which project downwardly from the lower flange 14. The side edges of the webs 22 taper downwardly from near the periphery of the lower flange 14 to the lower end of the tube 20, thus giving the webs 22 the appearance of gussets. The upper end of the tube 20 lies somewhat beyond the flat end wall 16 and is provided with a small stop flange 24.

The two flanges 12 and 14 of the spool 2 each have a small hole 26 (FIGS. 3–5) that lies beyond the cylindrical surface 10 a distance exceeding the thickness of the line 1. The holes 26 align axially.

Unlike the spool 2, the float 4 has a specific gravity less than water—indeed, considerably less than water—and as a consequence, it tends to float when the bobber 2 enters the water. The float 4 should possess enough buoyancy to support the spool 2, the portion p of the line that lies beyond the spool 2, and also the sinker s and hook h within the water. In short, the float 4 keeps the entire bobber B afloat in the water. Preferably the float 4 is formed from a rigid expanded polymer such as Styrofoam.

The float 4 possesses a generally cylindrical shape 30 (FIGS. 1 and 2), its diameter being no greater than that of the two flanges 12 and 14 on the spool 2. Along its center axis, the float has a bore 32, and a short counterbore 34 in the upper end of the bore 32. The guide tube 20 of the spool 2, passes through the bore 32 and counterbore 34 of the flange 4. But the float 4 is considerably shorter than the portion of the tube 24 that is exposed above the upper flange 12 and flat wall 16, that is the portion between the stop flange 24 and the flat wall 16, and moreover, the diameter of the bore 32 exceeds the diameter of the tube 20 with enough clearance to enable the float 4 to slide easily over the tube 20. That it will do, being limited in one direction by the flange 12 and end wall 16 and in the other by the stop flange 24 on the guide tube 20. Actually, the counterbore 34 is large enough to receive the stop flange 24 at the upper end of the tube 20. Thus, the float 4 moves on the spool 2 between a cocked position (FIG. 1), wherein it is against the upper flange 12 and flat end wall 16, and a release position (FIG. 2), wherein it is against the stop flange 24 at the remote end of the tube 20 with the flange 24 being received in the counterbore 34.

The float 4 carries a retaining pin 36 (FIGS. 1 and 2) which projects axially from the float 4 and aligns with the guide holes 26 in the flanges 12 and 14 of the spool 2. It moves with the float 4 between cocked and release positions. The length of the cylindrical surface 10 on the spool 2 is slightly less than the axial displacement of the float 4 between its cocked and release positions. As a consequence, the pin 36 remains continuously in the guide hole 26 of the upper flange 12, even when the float 4 and pin 36 are in the release position (FIG. 2). However, when in this position, the lower end of the retaining pin 36 lies close to the upper flange 12, leaving most of the cylindrical surface 10 unobstructed. On the other hand, when the float 4 and pin 36 are in the cocked position (FIG. 1), the pin 36 projects through both guide holes 26 and thus extends along the entire length of the cylindrical surface 10. Indeed, the lower or free end of the pin 36 lies slightly below the lower flange 14. To facilitate entry of the pin 36 into the hole 26 of the lower flange 14, the lower end of the pin 36 is slightly tapered. Of course, the diameter of the two guide holes 26 exceeds the diameter of the pin 36-indeed with enough clearance to enable the float 4 to move easily between the extended and retracted positions. Since the holes 26 lie beyond the cylindrical surface 10, so does the pin 36. Enough clearance exists between the surface 10 and the pin 36 to accommodate the line 1—preferably, several layers of the line 1.

Figure 6:
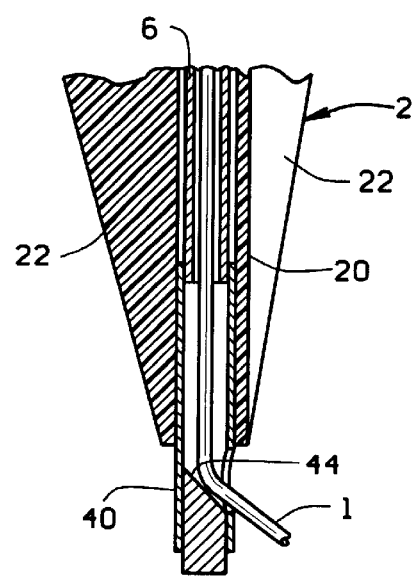
FIG. 6 is a fragmentary view taken along line 6—6 of FIG. 1.
Figure 7:
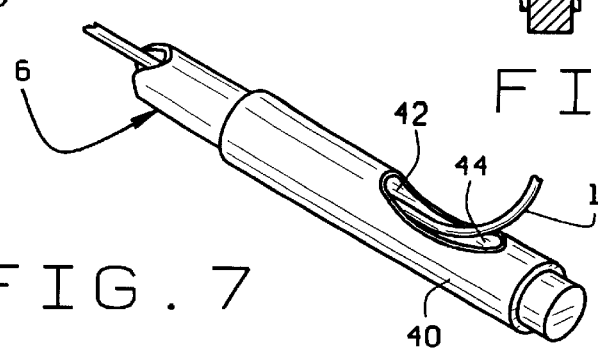
FIG. 7 is a fragmentary perspective view of the line tube within which a fishing line passes through the bobber.

The line tube 6 extends through the guide tube 20 of the spool 2 with enough clearance to slide easily in the tube 20 (FIG. 6). Its interior, on the other hand, is large enough to ccommodate the line 1. At its lower end the line tube 6 is fitted with a ferrule 40. While the ferrule 40 is small enough to slide easily through the guide tube 20, the difference between its outside diameter and the inside diameter of the tube 20 is less than the thickness of the line 1. The ferrule 40 is closed at its end, but is provided with a lateral opening 42 (FIG. 7) and a beveled surface 44 leading to the opening 42. The arrangement is such that end of the line 1, as it advances through the tube 6, encounters the beveled surface 44 of the ferrule 40 which deflects it out of the lateral opening 42, assuming, of course, that the lateral opening 42 is exposed beyond the end of the guide tube 20. When the ferrule 40 on the line tube 6 is retracted into the guide tube 20, the line 1 becomes lodged between the ferrule 40 and the inside surface of the guide tube 20 (FIG. 6), and this prevents the line 1 from slipping with ease one way or the other in the line tube 6 and, of course, secures the line 1 to the spool 2. At its upper end, the line tube 6 is fitted with a bead 46 which facilitates grasping the tube 6 and prevents the line tube 6 from falling through the guide tube 20. When the bead 46 rests against the upper end of the guide tube 20, the lateral opening 42 at the lower end of the line tube 6 is exposed enough to allow the line 1 to slide easily through the opening 42.

To attach the castable bobber B to the fishing line 1, the angler withdraws enough of the line 1 from the end of the fishing pole P to at least equal the depth at which the angler desires to fish. The angler shifts the line tube 6 in the guide tube 24 of the spool 2 sufficiently to expose the lateral opening 42 in the ferrule 40. With the opening 42 exposed, the angler inserts the free end of the line 1 into the upper end of the line tube 6 and threads the line 1 through the tube 6. After a short distance the free end of the line 1 encounters the beveled surface 44 which deflects it out of the lateral opening 42. Grasping the end of the line 1, the angler withdraws enough line 1 from the line tube 6 to generally equal the depth at which the angler desires to fish. This becomes the portion p which extends beyond the bobber B. Thereupon the angler, grasping the bead 46, shifts the line tube 6 in the opposite direction. This retracts the ferrule 40 into the lower end of the guide tube 20, causing the line 1 to lodge between the outside surface of the ferrule 40 and the inside surface of the guide tube 20. This secures the line 1 to the spool 2 of the bobber B so that the line 1 will no longer slip easily through the tube 6. Actually, the force with which the angler retracts the line tube 6 into the guide tube 20 determines how tightly the line 1 is secured to the spool 2. The line 1 may be secured with a moderate force to prevent it from sliding easily through the line tube 6, in which case it will still slip through the line tube 6 if enough force is applied to it. On the other hand, the line 2 may be secured with a heavier force so that it will not slip.

Next, the angler ties the sinker s and hook h to the free end of the line 1. Once bait is placed on the hook h, the angler is ready to cast.

To cast the line 1 with the bobber B, sinker s and hook h on it, the angler first stores the extended portion p of the line 1 on the spool 2 of the bobber B. To this end, the angler places the float 4 in its release position (FIG. 2) on the spool 2, so that the retaining pin 36 for the most part lies beyond the cylindrical storage surface 10 of the spool 2. Then the angler winds the extended portion p of the line 1 around the surface 10, taking care to avoid the short portion of the pin 36 that projects below the upper flange 12. When the portion p is wound to its fullest extend on the surface 10 of the spool 2, the angler moves the float 4 to its cocked position (FIG. 1) against the upper flange 12 and the end wall 16. This places the retaining pin 36 across the cylindrical surface 10 and projects its tapered free end through the hole 26 in the lower flange 14. The convolutions of the extended portion p thus become captured between the cylindrical surface 10 and the retaining pin 36. The space between the pin 36 and the surface 10 is much to small to pass the sinker s, so the portion p of the line 1 does not unravel from the surface 10, but instead remains captured on the surface 10.

Once the remainder of the line 1 is withdrawn onto the fishing rod R, such as by bringing it in with a reel on the rod R, the angler is ready to cast. The casting technique is conventional. While swinging the rod R through an arc, the angler releases the line 1. The bobber B, under it own momentum, continues outwardly away from the rod R. The centrifugal force generated by the swinging motion drives the float 4 outwardly along with the spool 2, so the float 4 is urged to its cocked position on the spool 2. The float 4 remains in its cocked position as the bobber B sails through the air. The line 1 pays off of the reel.

When the bobber B strikes the water, the spool 2, being heavy, tends to sink whereas the float 4 tends to remain at the surface of the water. This causes the float 4 to shift to its release position (FIG. 2) on the guide tube 20. The shift in position withdraws the retaining pin 36 out of the guide hole 26 in the lower flange 14 and brings its tapered end to the upper flange 12. As its pin 34 withdraws from the lower flange 14 it releases the extended portion p of the line 1. The sinker s drops and pulls the free end of the portion p downwardly. The portion p unwinds from the cylindrical surface 10 until it is fully extended under the weight of the sinker s. This presents the hook h and bait at the depth desired, and that depth may exceed the length of the rod R.

As the portion p of the line 1 pays off of the surface 10 on the spool 2 it applies a slight torque to the spool 2, causing the spool 2 to rotate in the water. But the webs 22 resist this tendency to rotate and in that sense minimize the rotation. Since the stop flange 24 at the upper end of the guide tube 20 is recessed into the counterbore 34 at the upper end of the float 4, the line 1 does not become entangled on or beneath the flange 24. The bead 46, being spherical, does not tend to ensnare the line 1, but on the contrary, the line 1 simply slides over the bead 46.

The bobber B wobbles in the water as the portion p of the line 1 pays off of it, and this wobbling signals to the angler that the portion p is deploying properly. When the portion p fully pays off of the cylindrical surface 10, the bobber b will dip slightly in the water, owing to the interruption of the momentum in the descent of the sinker s. This sends another signal—one indicating that the portion p is fully deployed. On the other hand, if the angler does not see a slight dip, the angler will recognize that the sinker s has probably come to rest on the bottom. In that case, the angler withdraws the bobber B and shortens the length of the portion p.

If the line 1 is secured between the line tube 6 and the guide tube 20 with a moderate force, so that it will slip, the angler upon bringing the bobber B to the end of the rod R may keep on reeling, where upon the line 1 will slip through the line tube 6, causing the portion p to become shorter and shorter. Eventually, the sinker s will arrive at the bobber B and the hook h only slightly beyond it. This enables the angler to remove a fish from the hook h without struggling with an extended length of the line—that is an extended portion p—between the end of the rod R and the hook h.

This invention is intended to cover all changes and modifications of the example of the invention herein chosen for purposes of the disclosure which do not constitute departures from the spirit and scope of the invention.

What is claimed is:

1. In combination with a fishing line, a bobber for establishing a predetermined length of the line that will descend into water when the bobber floats at the surface of the water, said bobber comprising: a line holding member configured to hold the predetermined length of the line in a stored condition so that the end of the line is near the holding member; the line holding member containing a bore; a line tube extending through the bore in the holding member and having the line extended through it and out of it and thence to the stored condition, the line tube being movable within the bore between a first position in which the line is clamped by the second tube and a second position in which the line is released by the second tube and can slip through the second tube; a retainer movable between cocked and release positions and retaining the predetermined length of line in the stored condition when in its cocked position and releasing the predetermined length when in its release condition; and a float mounted on and shiftable relative to the holding member, the float being connected to the retainer to move the retainer from its cocked to its release position when the bobber enters water.

2. The combination according to claim 1 wherein the float has a density less than water and the holding member a density greater than water, and the float moves generally away from the holding member when the bobber enters water, yet has enough buoyancy to support the line holding member in water.

3. The combination according to claim 2 wherein the line holding member has a storage surface around which the predetermined length of line may be wound to place the predetermined length of line in its stored condition.

4. The combination according to claim 3 wherein the line holding member has a guide over which the float slides as the retainer moves between its cocked and release positions; and wherein the retainer lies along the storage surface of the line holding member when in its cocked position and is generally away from the storage surface when in its release position.

5. The combination according to claim 4 wherein the retainer moves parallel to the guide and the direction in which the float moves over the guide.

6. The combination according to claim 2 wherein the line holding member has an axis; wherein the line is wound around the axis when the line is in its stored condition; wherein the line tube lies along the axis; wherein the line enters the line tube generally along the axis and leaves the line tube generally along the axis; and wherein, when the line is released from its stored condition, it extends generally along the axis beyond the end of the line tube.

7. The combination according to claim 1 wherein the line tube has an opening that is presented laterally; and wherein the line passes out of the second tube at the opening and is lodged between the line tube and the end of the bore when the line tube is in its first position.

8. A bobber for attachment to a fishing line, said bobber comprising: a spool having a storage surface configured to hold a fishing line in a generally wound condition so that the line generally does not extend significantly beyond the bobber when so wound, the spool also having a tubular guide, the spool being dense enough to sink when placed in water; a float connected to the spool around the guide on the spool such that the float is capable of shifting between first and second positions with respect to the spool along the guide, the float having a retaining pin which lies parallel to the guide of the spool and extends along, yet is spaced outwardly from, the storage surface to maintain the line in a wound condition around the storage surface when the float is in its first position, but is withdrawn from the storage surface so as to free the line from the storage surface and release the line from the spool when the float is in its second position, the float having sufficient buoyancy to prevent the bobber from sinking in water; and a line tube located in the tubular guide for receiving the fishing line and enabling the line to pass through the spool, the line tube being capable of moving between a first position in which it secures the line to the spool and a second position wherein it releases the line from the spool so that the line may slip easily through the line tube.

* * * * *